United States Patent [19]

Hibata

[11] Patent Number: 5,232,177
[45] Date of Patent: Aug. 3, 1993

[54] SEATBELT RETRACTOR
[75] Inventor: Ganta Hibata, Ebina, Japan
[73] Assignee: NSK Ltd., Japan
[21] Appl. No.: 760,482
[22] Filed: Sep. 16, 1991
[30] Foreign Application Priority Data Sep. 17, 1990 [JP] Japan .............................. 2-96464[U]

[51] Int. Cl.⁵ .......................................... B65H 75/48
[52] U.S. Cl. ............................................. 242/107.4 B
[58] Field of Search ................ 242/107.4 B, 107.4 A, 242/107.4 R; 280/801, 806, 807

[56] References Cited

U.S. PATENT DOCUMENTS

| | | | |
|---|---|---|---|
| 4,190,213 | 2/1980 | Ueda | 242/107.4 A |
| 4,262,858 | 4/1981 | Takada | 242/107.4 A |
| 4,422,594 | 12/1983 | Hörl | 242/107.4 A |
| 4,436,255 | 3/1984 | Matsui et al. | 242/107 |
| 4,552,319 | 11/1985 | Gavagan et al. | 242/107.4 A |
| 4,573,646 | 3/1986 | Willey | 242/107 |
| 4,717,089 | 1/1988 | Tamura | 242/107.4 B X |
| 4,741,491 | 5/1988 | Andersson et al. | 242/107.4 A X |
| 4,811,912 | 3/1989 | Takada et al. | 242/107 |
| 4,844,375 | 7/1989 | Ballet | 242/107.4 B X |
| 4,948,066 | 8/1990 | Matsumoto et al. | 242/107 |
| 5,127,598 | 7/1992 | Fujimura | 242/107.4 A X |

FOREIGN PATENT DOCUMENTS

| | | |
|---|---|---|
| 59-76252 | 5/1984 | Japan . |
| 59-79152 | 5/1984 | Japan . |
| 60-151748 | 10/1985 | Japan . |

Primary Examiner—Daniel P. Stodola
Assistant Examiner—John P. Darling
Attorney, Agent, or Firm—Wegner, Cantor, Mueller & Player

[57] ABSTRACT

A seatbelt retractor is constructed of a ratchet wheel secured on a take-up spindle; an inertia member normally turnable with the spindle, said inertia member being, however, capable of turning relative to the spindle; a latch member provided for rotation in a webbing-releasing direction together with the spindle, whereby a pawl member can be brought into engagement with the ratchet wheel to prevent the spindle from rotating in the webbing-releasing direction; a lock device for interconnecting the latch member to the spindle when the inertia member develops a lag in rotation relative to the spindle; and a control device for shifting, depending on a wound amount of the webbing, an engaging member between a first position where the engaging member is engageable with the inertia member to prevent any further rotation of the inertia member or a second position where the engaging member is kept out of engagement with the inertia member. The control device has an engaging member supported rockably on the latch member, a control disk rotatable responsive to rotation of the ratchet wheel and a lever member movable following a guide portion of the control disk to bring the engaging member to the first position or the second position.

8 Claims, 4 Drawing Sheets

SEATBELT RETRACTOR

FIELD OF THE INVENTION

The present invention relates to a seatbelt retractor, and especially to an improvement in a seatbelt retractor equipped with both an emergency locking mechanism and an automatic locking mechanism.

DESCRIPTION OF THE RELATED ART

A seatbelt for safely holding in a seat an occupant or the like of a vehicle has conventionally been constructed of a webbing, a buckle, an anchorage and a retractor.

The retractor is a device for automatically winding the webbing therein when the seatbelt is not used. It protects the webbing from damage and, when the seatbelt is in use, allows adjustment of the length of the webbing as desired.

These retractors include automatic locking retractors, emergency locking retractors, etc. To overcome problems such as an occupant being restrained too tightly and hence feeling as if he is forcibly held, seatbelts generally use an automatic locking retractor equipped with an emergency locking mechanism to physically lock the retractor by an inertia sensing means responsive to sudden acceleration, collision or deceleration, thereby effectively restraining the occupant safely while reducing the feeling of being forcibly held by the webbing.

Examples of inertia sensing means usable in such emergency locking retractors include a sensing means which detects the speed of release of the webbing. This sensing means is constructed, for example, in such a way that, when an inertia member develops a lag in rotation relative to a take-up spindle, a lock member interconnects the take-up spindle and a latch member to each other to cause the latch member to rotate in a webbing-releasing direction together with the take-up spindle and a cam portion of the latch member is hence caused to act on a driven portion of a pawl member to bring the pawl member into engagement with a ratchet wheel provided integrally with the take-up spindle, whereby any further rotation of the take-up spindle in the webbing-releasing direction is prevented. In emergency locking retractors of the construction that rotation of the take-up spindle in the webbing-releasing direction is prevented using inertia force of such an inertia member, occurrence of a situation where the above-described inertia force is produced may prevent rotation of the take-up spindle in the webbing-releasing direction even under a non-emergency situation, namely, even when emergency locking is not required. When the webbing is abruptly taken up fully, i.e., over its entire length by spring force of a take-up spring from a released position, the lock member interconnects the take-up spindle and the latch member to each other by the resulting impact so that any further rotation of the take-up spindle in the webbing-releasing direction is prevented. As a consequence, the take-up spindle cannot rotate in the webbing-releasing direction and, at the same time, the webbing is in a fully wound state. The take-up spindle cannot therefore rotate in a webbing-winding direction either. Once this happens, the webbing can be wound out and in within a narrow range only, namely, between the situation that the pawl member and the ratchet wheel are engageable with each other and the situation that the pawl member actually engages the ratchet wheel. This actually means that neither release of the webbing nor take-up of the webbing is feasible, resulting in the problem that the retractor has been brought into a so-called "locked-up" state.

To overcome this problem, a mechanism for preventing tightening of a webbing wound on a reel (hereinafter simply called the "tightening preventing mechanism") is provided as disclosed in Japanese Utility Model Application Laid-Open No. SHO 62-78557, etc. According to the tightening preventing mechanism, a release angle, which is an angle of rotation of the take-up spindle in the webbing-winding direction required to release the locking of the take-up spindle, is designed smaller than a locking angle which is an angle of rotation of the take-up spindle in the webbing-releasing direction required from the occurrence of a lag in the rotation of the inertia member relative to the take-up spindle until rotation of the take-up spindle in the webbing-releasing direction. Namely, the tightening preventing mechanism makes it possible to release the locking of the take-up spindle by winding back the webbing over a small length not greater than the width of one tooth of the ratchet wheel even when rotation of the take-up spindle in the webbing-releasing direction is prevented, whereby the lock-up of the retractor can be released.

In such an emergency locking retractor as described above, release of a webbing is not prevented normally. When baggage, a child seat or the like is secured to a seat by the webbing, the webbing is therefore gradually wound out from the retractor, resulting in the problem that the baggage, child seat or the like becomes loose.

Japanese Utility Model Application Laid-Open Nos. SHO 59-79152 and SHO 60-151748, etc. therefore disclose seatbelt retractors of the type that an automatic locking mechanism is actuated upon fastening baggage, a child seat or the like on a seat but an emergency locking mechanism is actuated upon restraining an occupant. These seatbelt retractors include an emergency locking mechanism, and are constructed such that an automatic locking mechanism can be changed over from an actuated state to a non-actuated state and vice versa by suitably controlling the wound state of the webbing in the retractors.

Such seatbelt retractors are provided with a known emergency locking mechanism and a control means. The emergency locking mechanism in turn has an inertia member for sensing the speed of release of a webbing and a pawl member engageable with a ratchet wheel fixed on a take-up spindle to prevent the take-up spindle from rotating in a webbing-releasing direction. Depending on the wound state of the webbing, the control means brings an engaging member into engagement with the inertia member to actuate the emergency locking mechanism. The pawl member can therefore be shifted, as desired, to a position where the pawl member is engageable with the ratchet wheel or to another position where the pawl member is not engageable with the ratchet wheel. Engagement of the pawl member with the ratchet wheel by the control means prevents rotation of the take-up spindle in the webbing-releasing direction so that the automatic locking mechanism is actuated.

However, in the case of a seatbelt retractor in which an automatic locking mechanism for actuating an emergency locking mechanism by such a control means as described above to bring a pawl member into engagement with a ratchet wheel fixed on a take-up spindle and hence to prevent any further rotation of the take-up spindle in a webbing-releasing direction is assembled in an emergency locking retractor having the aforementioned tightening preventing mechanism, the engagement of the pawl member with the ratchet wheel is first released by winding back the webbing over a small length not greater than the width of one tooth of the ratchet wheel because the release angle of the take-up spindle is smaller than its locking angle. When the webbing is then wound out from that state to lock the take-up spindle, the point of initiation of engagement of the pawl member with the ratchet wheel is shifted in the webbing-releasing direction from the release point. If the webbing is wound out after winding it back over a small length not greater than the width of one tooth of the ratchet wheel, the take-up spindle rotates in the webbing-releasing direction over a length equal to the width of one tooth of the ratchet wheel so that the webbing is allowed to extend out accordingly, leading to problems such that the child seat or the like becomes loose.

SUMMARY OF THE INVENTION

An object of the present invention is to overcome the problems described above and to provide an easy-to-use seatbelt retractor including an automatic locking mechanism assembled in an emergency locking retractor, said retractor permitting change of an emergency locking function to an automatic locking function by a simple operation, prevention of extension of a webbing upon actuation of the automatic locking mechanism and sure restraint of a child seat or the like.

In one aspect of the present invention, there is thus provided a seatbelt retractor comprising:

a ratchet wheel secured on a take-up spindle for winding a webbing thereon;

an inertia member normally turnable with the take-up spindle, said inertia member being, however, capable of turning relative to the take-up spindle;

a latch member provided for rotation in a webbing-releasing direction together with the tape-up spindle, whereby a pawl member can be brought into engagement with the ratchet wheel to prevent the take-up spindle from rotating in the webbing-releasing direction;

a lock means for interconnecting the latch member to the take-up spindle when the inertia member develops a lag in rotation relative to the take-up spindle; and a control means for shifting, depending on a wound amount of the webbing, an engaging member between a first position where the engaging member is brought into engagement with the inertia member to prevent any further rotation of the inertia member or a second position where the engaging member is kept out of engagement with the inertia member, said control means having the engaging member supported rockably on the latch member, a control disk rotatable responsive to rotation of the ratchet wheel and a lever member movable following a guide portion of the control disk to bring the engaging member to the first position or the second position.

The above-described object of the present invention can be attained by the seatbelt retractor.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
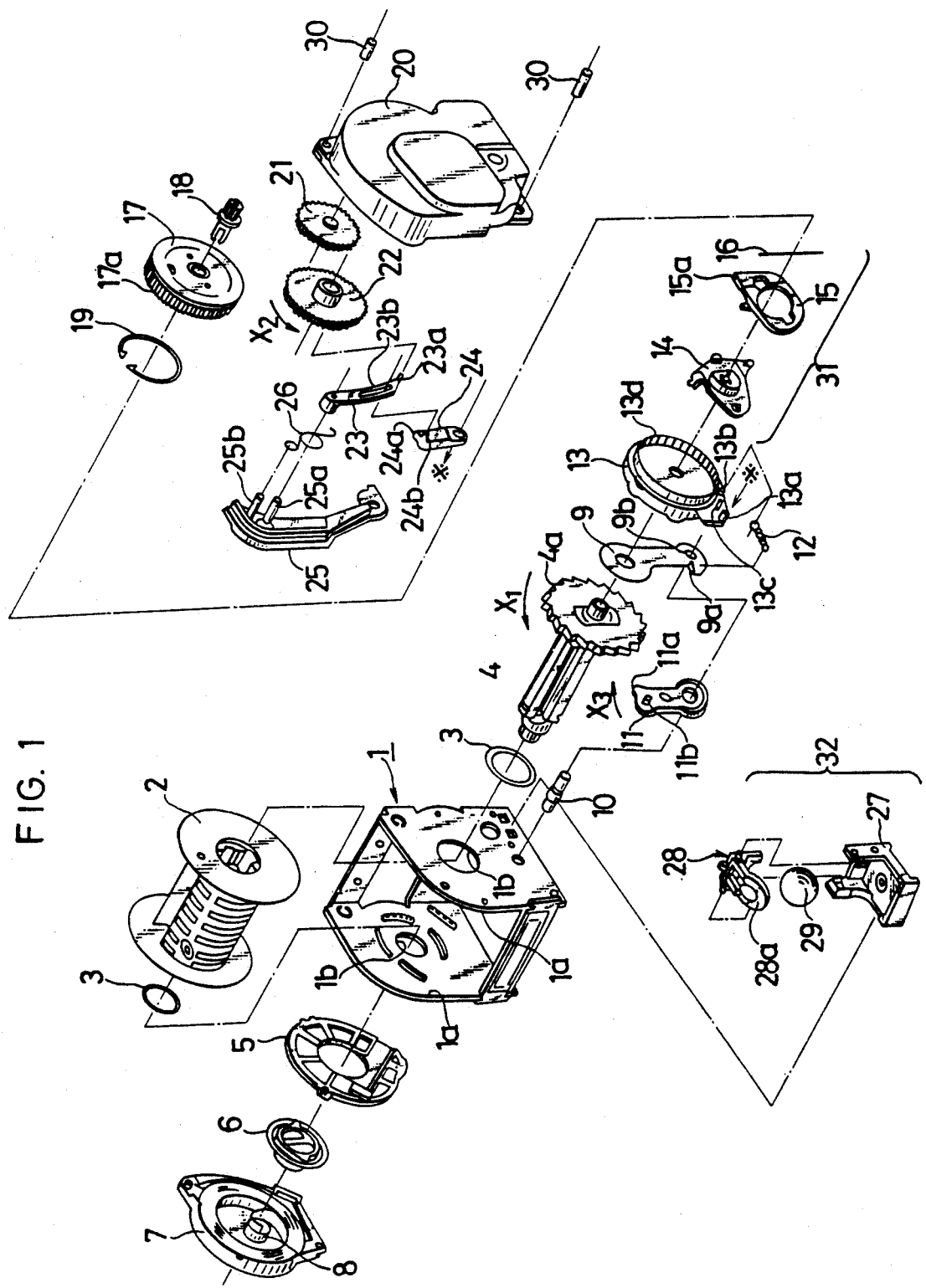
FIG. 1 is an exploded perspective view of a seatbelt retractor according to one embodiment of the present invention.

Referring to FIG. 1, a base 1 is substantially a square U-shaped cross-section in a large majority thereof, with through-holes 1b,1b bored in an opposing relationship in opposing side walls 1a,1a, respectively. A take-up spindle 4 with a take-up reel 2 fixed thereon, said take-up reel 2 being adapted to wind a webbing thereon, is rotatably supported by the through-holes 1b,1b via left-hand and right-hand plastic bushings 3,3. A retainer 6 on which an inner end of a take-up spring 8 is hooked is arranged on one end of the take-up spindle 4, and an outer end of the take-up spring 8 is hooked on an inner wall of an upper cover 7 which is fixedly secured together with a lower cover 5 on the left-hand side wall 1a of the base 1. The take-up spindle 4 is therefore normally biased in a webbing-winding direction.

On the other end of the take-up spindle 4, an emergency locking mechanism is arranged to prevent release of the webbing in the event of an emergency. This emergency locking mechanism has a latch plate 4a which is a ratchet wheel fixed on the other end of the take-up spindle 4. A part of the take-up spindle 4 extends out through the latch plate 4a. A tension plate 9 and a latch cup 13 having internal teeth 13d are loose-fitted on the extended part of the take-up spindle 4. A return spring 12 extends between a spring hanger 13b formed on the latch cup 13 and another spring hanger 9a formed on the tension plate 9, whereby the tension plate 9 and the latch cup 13 are biased to rotate in opposite directions, respectively. On the take-up spindle 4 located outside the latch cup 13, there are fixed a lock member 15 with a lock portion 15a formed thereon, said lock portion 15a being engageable with one of the inner teeth 13d, a flange 14, and a sensor spring 16. These lock member 15, flange 14 and sensor spring 16 make up a lock means 31. Provided further outside of the lock member 15 is a ratchet wheel 17, which is an inertia member loose-fitted on a main gear 18 fixed on the flange 14. A plurality of teeth 17a are formed in an outer peripheral surface of the ratchet wheel 17. These teeth 17a are directed in a webbing-releasing direction and are engageable with a lock arm 14 as an engaging member to be described subsequently. The ratchet wheel 17 is interconnected to the lock member 15 by way of a friction spring 19 so that the ratchet wheel 17 is rotatable integrally with the take-up spindle 4 and is also displaceable relative to the take-up spindle 4.

Further, a pawl 11 is pivotally supported as a pawl member on an outer surface of the right-hand side wall 1a by way of a pawl pin 10 in such a way that the pawl 11 is engageable with and disengageable from the latch plate 4a. Upon engagement with the latch plate 4a, the pawl 11 can prevent rotation of the latch plate 4a in the direction indicated by arrow $X_1$. A through-hole 9b formed in a free end portion of the tension plate 9 is fitted on the pawl pin 10. A pointed pawl guide 11b is provided on the pawl 11. This pointed pawl guide 11b is inserted in a pawl guide receiving slot 13c formed in a flange portion which is in turn formed as an extension on an outer peripheral portion of the latch cup 13 (see FIGS. 9 and 10).

On a lower part of the right-hand side wall 1a, a sensor case 27 forming a vehicle acceleration/deceleration sensing means 32 is fixedly arranged. Within a hollow space of the sensor case 27, a ball weight 29 is mounted as a sensor and a sensor arm 28 having an extension 28a is rockably provided. A sensor cover 20 is fixed by pins 30,30 on the outer surface of the right-hand side wall 1a, covering the above emergency locking mechanism.

Figure 2:
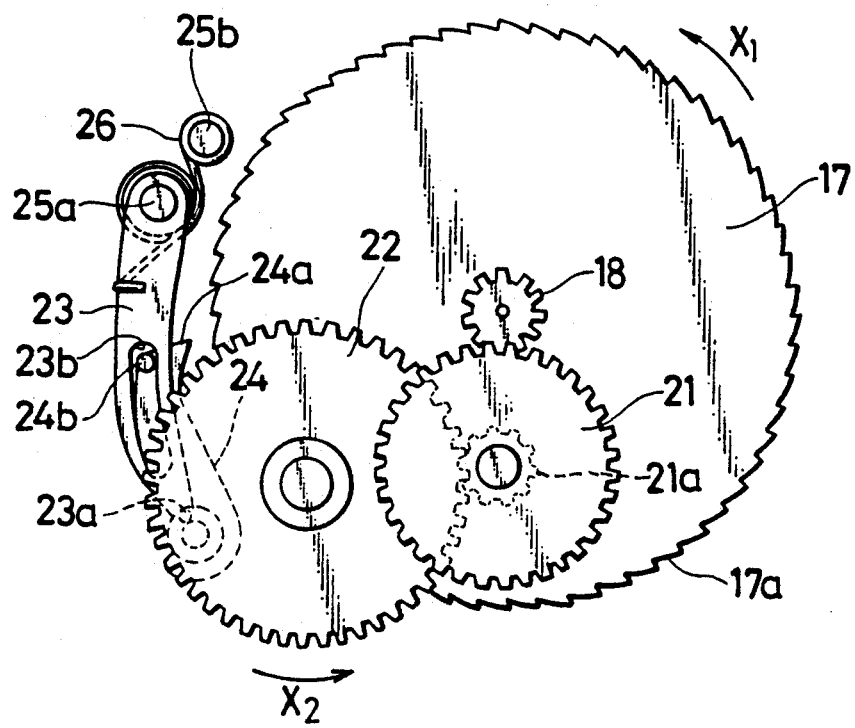
FIG. 2 is an enlarged fragmentary view of the seatbelt retractor shown in FIG. 1.

Provided for rotation on an inner wall of the sensor cover 20 are an idle gear 21 meshed with the main gear 18 and a control plate 22 meshed as a control disk with a small-diameter gear 21a of the idle gear 21 and rotated at a reduced speed (see FIG. 2). An inner surface of the control plate 22 defines a guide groove which makes up a control mechanism together with a lever 23 and a lock arm 24 as will be described subsequently (see FIGS. 2–4).

In addition, the lever 23 is rockably supported on a pivot 25a provided on a lower cover 25 which is attached on the right-hand side wall 1a and is positioned between the sensor cover 20 and the right-hand side wall 1a. A projection 23a formed on a free end portion of the lever 23 is received in the guide groove of the control plate 22, so that the lever 23 is rocked along a cam surface of the guide groove. The free end portion of the lever 23 is biased toward the center of rotation of the control plate 22 by means of a coil spring 26 secured at one end thereof on a pin 25b provided on the lower cover 25.

A guide groove 23b is formed in the lever 23. A projection 24b formed on the lock arm 24, which is rockably supported on a supporting shaft 13a provided on the latch cup 13, is provided in engagement with the guide groove 23b. In association with the rocking movement of the lever 23, the lock arm 24 therefore moves so that its engaging portion 24a is brought to a position where the engaging portion 24a engages one of the teeth 17a of the ratchet wheel 17 or to another position where the engaging portion 24a is kept out of engagement with any of the teeth 17a.

Figure 3:
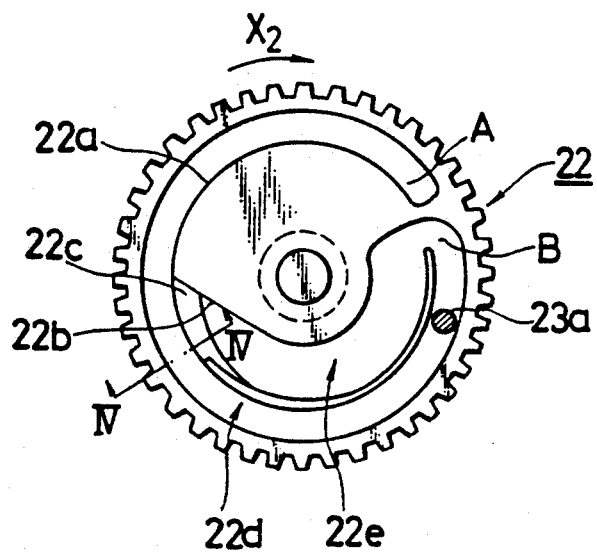
FIG. 3 is a front view of a control plate illustrated in FIG. 1.

Namely, the guide groove of the control plate 22 has an outer groove 22d and an inner groove 22e as shown in FIG. 3. The outer groove 22d defines an outer cam surface 22a, which positions the projection 23a of the lever 23 in the vicinity of the outer periphery of the control plate 22 so that the lock arm 24 is maintained at the position where the lock arm 24 is out of engagement with the ratchet wheel 17. On the other hand, the inner groove 22e positions the projection 23a of the lever 23 in the proximity of the inner periphery of the control plate 22 so that the lock arm 24 is retained at the position where the lock arm 24 is engageable with the ratchet wheel 17. The outer groove 22d extends near the outer periphery of the control plate 22 and along substantially the entire periphery thereof. The inner groove 22e is located on an inner side of the control plate 22 relative to the outer groove 22d and extends approximately half the periphery of the control plate 22. The inner groove 22e communicates at one end thereof to one end of the outer groove 22d at the same depth. A stepped portion 22c shallower than the outer groove 22d is formed at the other end of the inner groove 22e. The inner groove 22e is communicated at said the other end to substantially a midpoint of the outer groove 22d (see FIG. 4).

Operation of the above seatbelt retractor will next be described.

Figure 5:
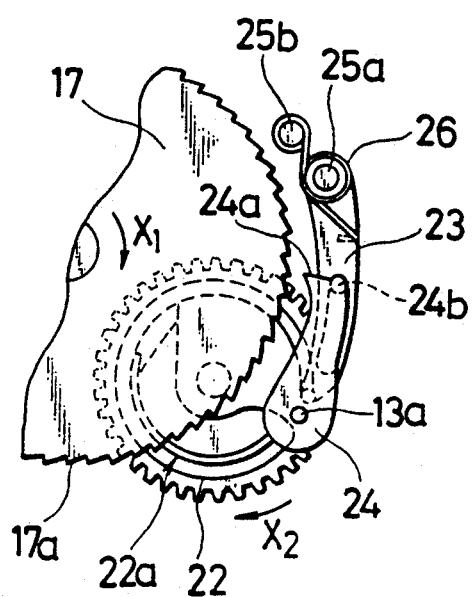
FIG. 5 to FIG. 8 are enlarged fragmentary views for the description of the operation of an automatic locking mechanism.

Firstly, in the state that the webbing has been wound up fully, as shown in FIG. 2 and FIG. 5, the projection 23a of the lever 23 is located in one end A (see FIG. 3) of the outer groove 22d of the control plate 22, and is pressed against the outer cam surface 22a by the biasing force of the coil spring 26 and, at the same time, is also urged against the bottom wall of the outer groove 22d by the resiliency of the lever 23 itself. At this time, the engaging portion 24a of the lock arm 24 is not in engagement with any of the teeth 17a of the ratchet wheel 17 so that the ratchet wheel 17 can rotate integrally with the take-up spindle 4.

Figure 4:
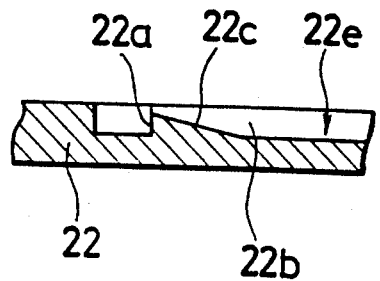
FIG. 4 is a cross-sectional view taken in the direction of arrows IV—IV of FIG. 3.

Next, when the webbing begins to be pulled out of the retractor, the take-up spindle 4 begins to rotate in the direction $X_1$, and the main gear 18 fixed on the flange 14, which is rotated integrally with the take-up spindle 4, also begins to rotate in the same direction. The control plate 22 therefore begins to rotate at a reduced speed in a direction indicated by arrow $X_2$, whereby the projection 23a of the lever 23 is caused to slide along the outer cam surface 22a. When the projection 23a has come to the stepped portion 22c of the control plate 22, the projection 23a is not allowed to override the stepped portion 22c and then to enter the inner groove 22e since the stepped portion 22c is formed shallower than the outer groove 22d at a portion adjacent the outer groove 22d as shown in FIG. 4. As has been described above, as long as the projection 23a is located on the outer cam surface 22a of the control plate 22, the engaging portion 24a of the lock arm 24 and any of the teeth 17a of the ratchet wheel 17 are maintained out of engagement. The retractor is therefore in the normal state that the emergency locking mechanism is operative. The automatic locking mechanism is in an inoperative state.

Figure 9:
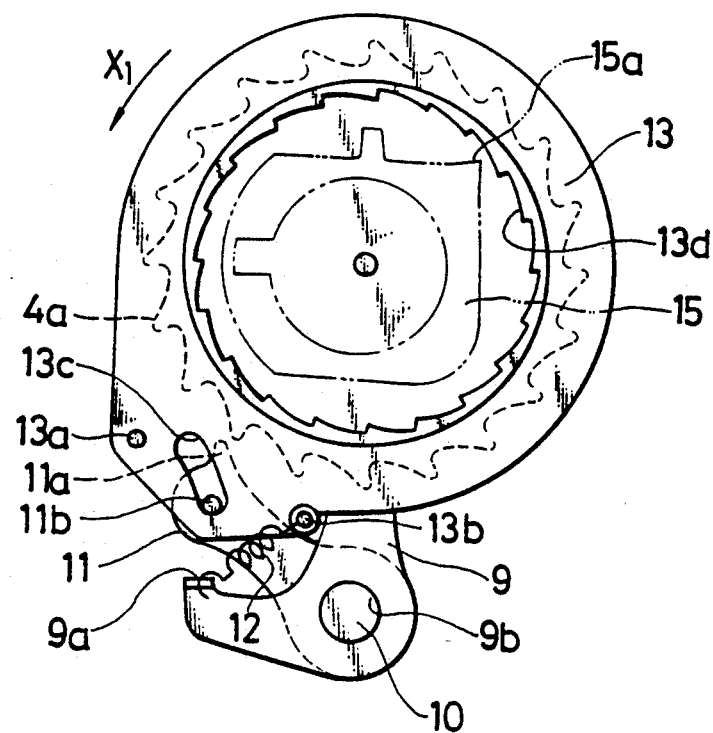
FIG. 9 and FIG. 10 are enlarged fragmentary views for the description of a locking operation by release of a webbing.

In normal use, as is illustrated in FIG. 9, the latch cup 13 is biased in a direction opposite to the direction $X_1$ by the biasing force of the return spring 12 hooked on the spring hanger 13b of the latch cup 13 and the spring hanger 9a of the tension plate 9. The pawl 11 with the pointed pawl guide 11b maintained in engagement with the pawl guide receiving slot 13c is therefore biased in a direction in which the engaging portion 11a is not engageable with the latch plate 4a, so that the webbing can be wound out as desired.

Figure 10:
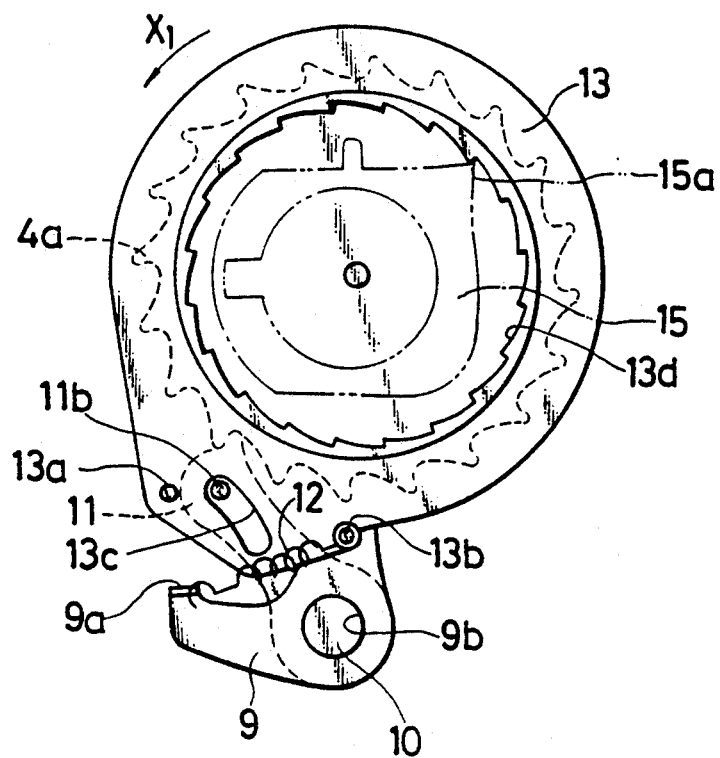

When a turning impact of at least a predetermined value is applied to the take-up spindle 4 in the webbing-releasing direction (i.e., the direction $X_1$) from an unillustrated webbing in the event of an emergency such as a collision, the ratchet wheel 17 cannot follow the rotation of the take-up spindle 4 in the webbing-releasing direction due to its own inertia so that the ratchet wheel 17 is displaced relative to the flange 14 provided integrally with the take-up spindle 4. As a result, the engaging portion 15a of the lock member 15 is brought to the position where the engaging portion 15a is engageable with one of the internal teeth 13d of the latch cup 13. Rotary force of the flange 14 is hence transmitted to the latch cup 13 so that, as shown in FIG. 10, the latch cup 13 is rotated in the direction $X_1$ against the biasing force of the return spring 12. At this time, the pawl guide receiving slot 13c with the pointed pawl guide 11b engaging therewith rotates the pawl 11 in a direction indicated by arrow $X_3$ (FIG. 1) by way of the pointed pawl guide 11b, whereby the engaging portion 11a is brought into engagement with the latch plate 4a. As a result, the take-up spindle 4 is prevented from rotating in the direction $X_1$, in other words, release of the webbing is prevented. It is to be noted that, when the latch cup 13 is rotated in the direction $X_1$, the lock arm 24 supported on the main shaft 13a of the latch cup 13 is also rotated together with the latch cup 13 but the projection 24b is slidable along the guide groove 23b and does not prevent rotation of the latch cup 13. When the vehicle undergoes a speed variation of at least a predetermined value in the event of an emergency, the ball weight 29 rolls to rock the sensor arm 28 so that the extension 28a is brought into engagement with one of the teeth 17a of the ratchet wheel 17. The ratchet wheel 17 is therefore prevented from rotating in the webbing-releasing direction. When the webbing is pulled out further while rotation of the ratchet wheel 17 is prevented, the ratchet wheel 17 rotates and is displaced in a direction opposite to the rotation of the take-up spindle 4 in the webbing-releasing direction so that the lock means 31 including the lock member 15 is actuated to prevent any further release of the webbing as described above.

Upon release of the tension applied to the webbing, the latch cup 13 is rotated by the biasing force of the return spring 12 in the direction opposite to the direction $X_1$. The pawl 11 is thus caused to turn in the direction opposite to the direction $X_3$, whereby the latch plate 4a is unlocked and the webbing can be wound out freely.

If the retractor is brought into a locked-up state by an impact produced as a result of abrupt full winding of the webbing by the spring force of the take-up spring from a wound-out state, the engagement between the engaging portion 15a of the lock member 15 and one of the internal teeth 13d of the latch cup 13 is released by winding back the webbing over a small length not greater than the width of one tooth of the ratchet wheel. Since no force is being applied at this time against the biasing force of the return spring 12 by which the latch cup 13 is biased in the direction opposite to the direction $X_1$, the latch cup 13 is caused to turn by the biasing force of the return spring 12 in the direction opposite to the direction $X_1$ so that the lock-up is released.

Figure 6:
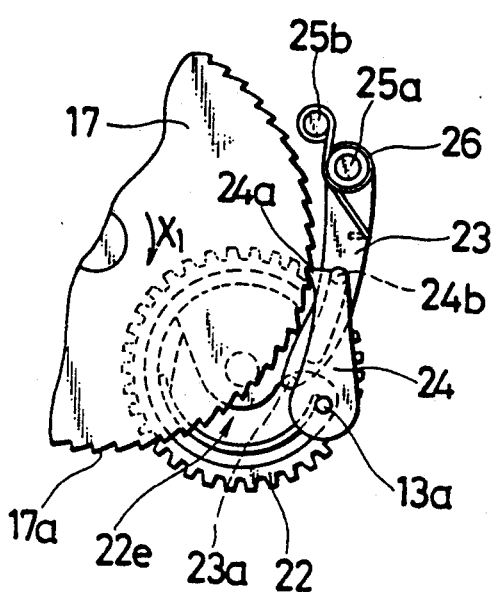
Figure 7:
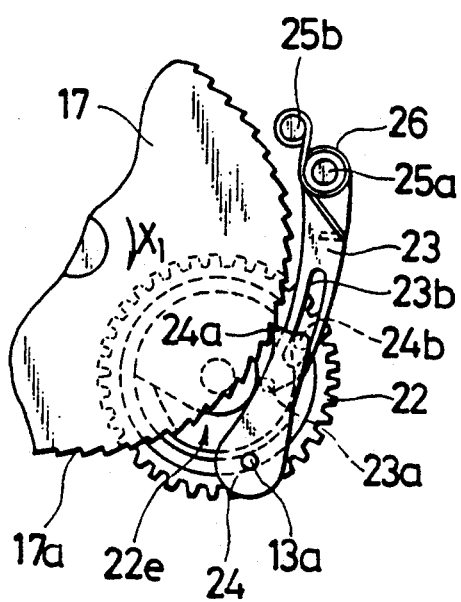
Figure 8:
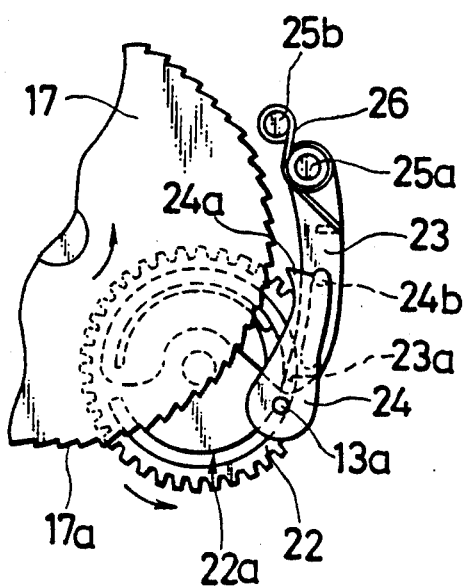

Next, when the webbing is fully wound out, the projection 23a enters the inner groove 22a through the cut-off portion B (see FIG. 3) of the control plate 22 as shown in FIG. 6 because the lever 23 is biased toward the center of rotation of the control plate 22 by the biasing force of the coil spring 26. At this time, the projection 24b of the lock arm 24 is guided by the guide groove 23b of the lever 23 so that the engaging portion 24a engages one of the teeth 17a of the ratchet wheel 17.

When the webbing begins to be wound in the retractor, the take-up spindle 4 begins to rotate in the direction opposite to the direction $X_1$. The ratchet wheel 17 also rotates in the same direction. The engaging portion 24a which is in engagement with one of the teeth 17a of the ratchet wheel 17 moves along a rear surface of said one of the teeth 17a so that the engaging portion 24a does not prevent the rotation of the ratchet wheel 17. Here, the projection 23a of the lever 23 moves in the inner groove 22e. The inner groove 22e has a sufficient width not to interfere with this movement of the projection 23a.

When the webbing is wound out from the retractor at this time and the take-up spring 4 begins to rotate in the direction $X_1$, the ratchet wheel 17 develops a lag in rotation relative to the take-up spindle 4 because the ratchet wheel 17 is in engagement with the lock arm 24 pivotally supported on the latch cup 13. As a result, the lock means 31 is actuated to interconnect the take-up spindle 4 and the latch cup 13 as described above. When the take-up spindle 4 rotates further in the direction $X_1$, the latch cup 13 also rotates in the direction $X_1$ so that the pawl guide receiving slot 13c engaged with the pivoted pawl guide 11b causes the pawl 11 to turn in the direction $X_3$ (see FIG. 1) into engagement with the latch plate 4a by way of the pointed pawl guide 11b. As a result, the take-up spindle 4 is prevented from rotating in the direction $X_1$, in other words, release of the webbing is prevented. As long as the projection 23a is located inside the inner groove 22e of the control plate 22, the engaging portion 24a of the lock arm 24 is always kept in engagement with one of the teeth 17a of the ratchet wheel 17 as described above so that the automatic locking mechanism is operative.

In the above-described state where the automatic locking mechanism is operative, the take-up spindle 4 and the latch cup 13 are interconnected together via the lock means 31 and the ratchet wheel 17 also rotates together with the take-up spindle 4 by way of the friction spring 19. The lock arm 24 which is in engagement with the ratchet wheel 17 is supported on the latch cup 13, so that the ratchet wheel 17 does not develop any lag in rotation and the angle of rotation of the ratchet wheel 17 is equal to that of the latch cup 13. Namely, in the state that the automatic locking mechanism is operative, the lock arm 24 is kept in engagement with the same tooth 17a of the ratchet wheel 17. Even when the take-up spindle 4 is prevented from rotating in the webbing-releasing direction by winding back the webbing over a small length not greater than the width of one tooth of the latch plate 4a and then winding out the webbing again, the engaging portion 11a of the pawl 11 engages the same tooth of the latch plate 4a as that engaged with before the webbing was wound back and, accordingly, the webbing is prevented from extending out.

When the webbing is taken up in this state over a length equal to or more than the width of one tooth of the latch plate 4a, the control plate 22 begins to 10 rotate in the direction opposite to the direction $X_2$ so that the projection 23a of the lever 23 moves along the inner cam surface 22b (see FIG. 3) formed on the inner wall of the inner groove 22e. Since the projection 23a is pushed out in the radial direction by the inner cam surface 22b at this time, the lever 23 rocks the lock arm 24 in the direction that the engagement between the engaging portion 24a and one of the teeth 17a would be released. When the webbing is taken up further, the projection 23 is pushed by the inner cam surface 22b so that the projection 23a overrides the tilted surface of the stepped portion 22c and enters the outer groove 22d. Here, the lock arm 24 is guided by the lever 23 and is released from the engagement with the ratchet wheel 17. While only the emergency locking mechanism is maintained in an operative state, the webbing is therefore taken up fully. The state where the emergency locking mechanism alone is operative can therefore be realized until the webbing is again wound out fully to guide the projection 23a of the lever 23 into the inner groove 22e.

Change from the emergency locking function to the automatic locking function can therefore be achieved by an extremely simple operation, that is, by winding out the webbing fully.

As is apparent from the embodiment described above, a control means for changing an emergency locking mechanism to an automatic locking mechanism and vice versa depending on a wound amount of a webbing can be constructed of a control means or mechanism and an engaging member, each being of a simple construction, and the webbing is prevented from extending upon actuation of the automatic locking mechanism. Both the reliability of the mechanism and the ease in use have been improved.

Needless to say, it is to be noted that the control means or mechanism, engaging member, lever member, lock means and the like in the present invention are not limited to the constructions and shapes of the embodiment described above and many changes and modifications can be made thereto.

I claim:

1. A seatbelt retractor comprising: a ratchet wheel secured on a take-up spindle for winding a webbing thereon;
    an inertia member normally turnable with the take-up spindle, said inertia member being, however, capable of turning relative to the take-up spindle;
    a latch member provided for rotation in a webbing-releasing direction together with the take-up spindle, the rotation of which brings a pawl member into engagement with the ratchet wheel to prevent the take-up spindle form rotating in the webbing-releasing direction;
    lock means for interconnecting the latch member to the take-up spindle when the inertia member develops a lag in rotation relative to the take-up spindle; and
    control means for shifting, depending on a wound amount of the webbing, an engaging member between a first position where the engaging member is brought into engagement with the inertia member to prevent any further rotation of the inertia member or a second position where the engaging member is kept out of engagement with the inertia member, said control means having the engaging member supported rockably on the latch member, a control disk rotatable responsive to rotation of the ratchet wheel, a lever member movable following a guide portion of the control disk to bring the engaging member to the first position or the second position, and means disposed between the engaging member and the lever member for permitting movement of the engaging member, which is located at the first position, relative to the lever member.

2. The retractor of claim 1, wherein the control disk has a first cam portion for holding the engaging member at a position where the engaging member is out of engagement with the inertia member, a second cam portion located inside the first cam portion and adapted to make the engaging member engageable with the inertia member, and a third cam portion capable of guiding the engaging ember from the second cam portion to the first cam portion but incapable of guiding the engaging member from the first cam portion to the second cam portion.

3. The retractor of claim 2, further comprising a means for biasing the lever member toward the center of the control disk.

4. The retractor of claim 3, wherein the control disk is rotated in association with rotation of the take-up spindle via a speed reduction mechanism.

5. The retractor of claim 1, where in said means for permitting the relative movement of the engaging member comprises a projection provided on one of the engaging members and the lever member and a groove formed in the other receiving the projection therein.

6. A seatbelt retractor comprising: a ratchet wheel secured on a take-up spindle for winding a webbing thereon;
    an inertia member normally turnable with the take-up spindle, said inertia member being, however, capable of turning relative to the take-up spindle;
    a latch member provided for rotation in a webbing-releasing direction together with the take-up spindle, the rotation of which brings a pawl member into engagement with the ratchet wheel to prevent the take-up spindle from rotating in the webbing-releasing direction;
    lock means for interconnecting the latch member to the take-up spindle when the inertia member develops a lag in rotation relative to the take-up spindle;
    an engaging member movable between a first position where the engaging member is engageable with the inertia member and a second position where the engaging member is kept out of engagement with the inertia member;
    a control mechanism for bringing the engaging member to the first position or to the second position depending on a wound amount of the webbing;
    means for holding the engaging member on the latch member; and
    means provided between the control mechanism and the engaging member for permitting movement of only the engaging member together with the latch member when the latch member rotates whereby the engaging member is allowed to move relative to the control mechanism.

7. The retractor of claim 6, where the control mechanism has a control disk rotatable responsive to the rotation of the ratchet wheel and a lever member guided by the control disk to bring the engaging member to the first or second position; and the means for permitting the movement of only the engaging member is disposed between the lever member and the engaging member.

8. The retractor of claim 7, wherein the interconnecting means has a projection provided on one of the engaging members and the lever member and a groove formed in the other and receiving the projection therein.

* * * * *